(12) United States Patent
Ushiku

(10) Patent No.: US 8,255,356 B2
(45) Date of Patent: Aug. 28, 2012

(54) APPARATUS AND METHOD OF GENERATING DOCUMENT

(75) Inventor: Toyohiko Ushiku, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 11/736,729

(22) Filed: Apr. 18, 2007

(65) Prior Publication Data

US 2007/0250485 A1    Oct. 25, 2007

(30) Foreign Application Priority Data

Apr. 25, 2006  (JP) ................... 2006-121144

(51) Int. Cl.
G07F 17/30    (2006.01)

(52) U.S. Cl. ...................................... 707/603
(58) Field of Classification Search .................... 707/603
See application file for complete search history.

(56) References Cited

U.S. PATENT DOCUMENTS

| | | | | |
|---|---|---|---|---|
| 4,819,162 A * | 4/1989 | Webb et al. | | 705/32 |
| 5,734,705 A * | 3/1998 | Schlossman et al. | | 379/117 |
| 5,836,304 A * | 11/1998 | Kellinger et al. | | 600/300 |
| 5,926,530 A * | 7/1999 | Schlossman et al. | | 379/117 |
| 5,991,306 A * | 11/1999 | Burns et al. | | 370/429 |
| 6,157,935 A * | 12/2000 | Tran et al. | | 715/202 |
| 6,202,060 B1 * | 3/2001 | Tran | | 1/1 |
| 6,226,618 B1 * | 5/2001 | Downs et al. | | 705/1.1 |
| 6,263,313 B1 * | 7/2001 | Milsted et al. | | 705/1.1 |
| 6,275,496 B1 * | 8/2001 | Burns et al. | | 370/429 |
| 6,298,373 B1 * | 10/2001 | Burns et al. | | 709/203 |
| 6,320,944 B1 * | 11/2001 | Schlossman et al. | | 379/117 |
| 6,324,182 B1 * | 11/2001 | Burns et al. | | 370/429 |
| 6,324,659 B1 * | 11/2001 | Pierro | | 714/48 |
| 6,338,152 B1 * | 1/2002 | Fera et al. | | 714/48 |
| 6,345,256 B1 * | 2/2002 | Milsted et al. | | 705/1.1 |
| 6,360,255 B1 * | 3/2002 | McCormack et al. | | 709/221 |
| 6,368,068 B1 * | 4/2002 | Corlew et al. | | 417/120 |
| 6,389,403 B1 * | 5/2002 | Dorak, Jr. | | 705/52 |
| 6,389,538 B1 * | 5/2002 | Gruse et al. | | 713/194 |
| 6,398,245 B1 * | 6/2002 | Gruse et al. | | 280/228 |
| 6,418,421 B1 * | 7/2002 | Hurtado et al. | | 705/54 |
| 6,574,609 B1 * | 6/2003 | Downs et al. | | 705/50 |
| 6,587,837 B1 * | 7/2003 | Spagna et al. | | 705/26 |
| 6,611,812 B2 * | 8/2003 | Hurtado et al. | | 705/26 |
| 6,668,354 B1 * | 12/2003 | Chen et al. | | 715/255 |

(Continued)

FOREIGN PATENT DOCUMENTS

JP        5-274311 A     10/1993

(Continued)

OTHER PUBLICATIONS

Gagne, Marcel. "Linux System Administration: A User's Guide", Nov. 2000. Available online at http://portal.acm.org/citation.cfm?id=364656.*

(Continued)

*Primary Examiner* — Mark Andrew X Radtke
(74) *Attorney, Agent, or Firm* — Canon USA, Inc., IP Division

(57) ABSTRACT

An apparatus receives an instruction indicating a time when a query for the data acquisition is to be executed. The apparatus executes the query at the time indicated in the received instruction, and generates a document using data acquired from the execution of the query.

9 Claims, 9 Drawing Sheets

U.S. PATENT DOCUMENTS

| | | | |
|---|---|---|---|
| 6,725,229 B2* | 4/2004 | Majewski et al. ................ 1/1 |
| 6,782,388 B2* | 8/2004 | Majewski et al. ................ 1/1 |
| 6,829,611 B2* | 12/2004 | Majewski et al. ................ 1/1 |
| 6,834,110 B1* | 12/2004 | Marconcini et al. ........ 380/239 |
| 6,859,791 B1* | 2/2005 | Spagna et al. ................ 705/51 |
| 6,862,591 B2* | 3/2005 | Majewski et al. ................ 1/1 |
| 6,954,737 B2* | 10/2005 | Kalantar et al. ............. 705/50 |
| 6,959,288 B1* | 10/2005 | Medina et al. ................ 705/51 |
| 6,983,371 B1* | 1/2006 | Hurtado et al. .............. 713/189 |
| 6,993,508 B1* | 1/2006 | Major et al. .................. 705/51 |
| 7,013,289 B2* | 3/2006 | Horn et al. ................ 705/14.51 |
| 7,046,689 B2* | 5/2006 | Burns et al. ................. 370/429 |
| 7,051,044 B1* | 5/2006 | Fera et al. ....................... 1/1 |
| 7,054,434 B2* | 5/2006 | Rodenbusch et al. .... 379/265.02 |
| 7,103,173 B2* | 9/2006 | Rodenbusch et al. .... 379/266.07 |
| 7,110,984 B1* | 9/2006 | Spagna et al. ................ 705/57 |
| 7,114,126 B2* | 9/2006 | Berger et al. ................ 715/750 |
| 7,140,011 B2* | 11/2006 | Hallford ...................... 717/165 |
| 7,142,662 B2* | 11/2006 | Rodenbusch et al. .... 379/266.07 |
| 7,167,893 B1* | 1/2007 | Malone et al. ............... 709/201 |
| 7,181,684 B2* | 2/2007 | Chittu et al. ................. 715/255 |
| 7,183,906 B2* | 2/2007 | Zanovitch et al. ........... 340/518 |
| 7,188,085 B2* | 3/2007 | Pelletier ...................... 705/50 |
| 7,203,760 B2* | 4/2007 | Shimada ..................... 709/235 |
| 7,206,748 B1* | 4/2007 | Gruse et al. ................. 705/1.1 |
| 7,213,005 B2* | 5/2007 | Mourad et ................... 705/64 |
| 7,228,437 B2* | 6/2007 | Spagna et al. ............... 713/193 |
| 7,269,564 B1* | 9/2007 | Milsted et al. ............... 705/1.1 |
| 7,277,448 B1* | 10/2007 | Long et al. .................. 370/412 |
| 7,277,870 B2* | 10/2007 | Mourad et al. .............. 705/51 |
| 7,336,174 B1* | 2/2008 | Maloney ..................... 340/572.1 |
| 7,346,580 B2* | 3/2008 | Lisanke et al. .............. 705/50 |
| 7,383,228 B2* | 6/2008 | Lisanke et al. .............. 705/51 |
| 7,383,498 B1* | 6/2008 | Hickl et al. .................. 715/235 |
| 7,385,478 B2* | 6/2008 | Martin et al. ............. 340/286.01 |
| 7,440,674 B2* | 10/2008 | Plotnick et al. .............. 386/68 |
| 7,487,128 B2* | 2/2009 | Spagna et al. ............... 705/51 |
| 7,657,887 B2* | 2/2010 | Kothandaraman et al. ... 717/176 |
| 7,793,215 B2* | 9/2010 | Cohen ........................ 715/249 |
| 2001/0014103 A1* | 8/2001 | Burns et al. .................. 370/429 |
| 2001/0039540 A1* | 11/2001 | Hofmann et al. ............ 707/3 |
| 2002/0052957 A1* | 5/2002 | Shimada ..................... 709/225 |
| 2002/0144262 A1* | 10/2002 | Plotnick et al. .............. 725/32 |
| 2002/0178447 A1* | 11/2002 | Plotnick et al. .............. 725/36 |
| 2002/0184525 A1* | 12/2002 | Cheng ........................ 713/201 |
| 2003/0231604 A1* | 12/2003 | Liu et al. ..................... 370/313 |
| 2004/0015132 A1* | 1/2004 | Brown ........................ 604/131 |
| 2004/0225644 A1* | 11/2004 | Squillante et al. ........... 707/3 |
| 2005/0060198 A1* | 3/2005 | Bayne ........................ 705/2 |
| 2005/0097599 A1* | 5/2005 | Plotnick et al. .............. 725/32 |
| 2006/0053411 A1* | 3/2006 | Takamiya ................... 717/115 |
| 2007/0162470 A1* | 7/2007 | Chang et al. ................ 707/100 |

FOREIGN PATENT DOCUMENTS

| | | |
|---|---|---|
| JP | 11-085859 A | 3/1999 |
| JP | 2004-328568 A | 11/2004 |
| JP | 2005-141478 A | 6/2005 |

OTHER PUBLICATIONS

Yoshio Oohashi, Maintenance Supporting System (Equipment Control Apparatus), Technical Report of Nippon Sigal Co., Ltd., Japan, Nippon Sigal Co., Ltd., Jan. 31, 1998, vol. 22, No. 1, pp. 57-64.

* cited by examiner

FIG. 4

```xml
<?xml version="1.0" encoding="UTF-8"?>
<xsd:schema xmlns:xsd="http://www.w3.org/2001/XMLSchema">
   <xsd:element name="script">
      <xsd:complexType>
         <xsd:sequence>
            <xsd:element ref="property" minOccurs="0" maxOccurs="unbouded"/>
            <xsd:element ref="run" maxOccurs="unbounded"/>
         </xsd:sequence>
      </xsd:complexType>
   </xsd:element>

<xsd:element name="property">
      <xsd:complexType>
         <xsd:attribute name="name" type="xsd:string"/>
         <xsd:attribute name="value" type="xsd:string"/>
      </xsd:complexType>
   </xsd:element>

<xsd:element name="run">
      <xsd:complexType>
         <xsd:sequence maxOccurs="unbounded">
            <xsd:choice minOccurs="0" maxOccurs="unbounded">
               <xsd:element ref="query"/>
               <xsd:element ref="sql"/>
            </xsd:choice>
            <xsd:element ref="interval" minOccurs="0"/>
         </xsd:sequence>
         <xsd:attribute name="at" type="xsd:time"/>
         <xsd:attribute name="mode" type="mode_name" default="sequential"/>
      </xsd:complexType>
   </xsd:element>

<xsd:element name="query">
      <xsd:complexType>
         <xsd:attribute name="id" type="xsd:string"/>
         <xsd:attribute name="prefix" type="xsd:string"/>
      </xsd:complexType>
   </xsd:element>

<xsd:element name="sql" type="xsd:string"/>

<xsd:element name="interval" type="xsd:duration"/>

<xsd:simpleType name="mode_name">
      <xsd:restriction base="xsd:string">
         <xsd:enumeration value="sequential"/>
         <xsd:enumeration value="concurrent"/>
      </xsd:restriction>
   </xsd:simpleType>

</xsd:schema>
```

FIG. 5

```
<?xml version="1.0" encoding="UTF-8"?>
<script>
    <run at="1:00AM">
        <query id="q1" prefix="q1_1"/>
    </run>
    <run at="2:00AM">
        <query id="q1" prefix="q1_2"/>
    </run>
    <run at="3:00AM">
        <query id="q2"/>
    </run>
</script>
```

FIG. 6

```
<?xml version="1.0" encoding="UTF-8"?>
<script>
    <run>
        <query id="q1"/>
        <interval>P3H</interval>
        <query id="q2"/>
    </run>
</script>
```

FIG. 7

```
<?xml version="1.0" encoding="UTF-8"?>
<script>
    <run mode="concurrent">    <!?- default mode is sequential mode -->
        <query id="q1"/>
        <query id="q2"/>
        <query id="q3"/>
    </run>
</script>
```

FIG. 9

```xml
<?xml version="1.0" encoding="UTF-8"?>
<xsd:schema xmlns:xsd="http://www.w3.org/2001/XMLSchema">
  <xsd:element name="contents">
    <xsd:complexType>
      <xsd:sequence>
        <xsd:element ref="script" minOccurs="0" maxOccurs="unbouded"/>
        <xsd:element ref="query" minOccurs="0" maxOccurs="unbouded"/>
        <xsd:element ref="layout"/>
      </xsd:sequence>
    </xsd:complexType>
  </xsd:element>

<xsd:element name="script">
    <xsd:complexType>
      <xsd:attribute name="name" type="xsd:string"/>
      <xsd:attribute name="entry" type="xsd:string"/>
    </xsd:complexType>
  </xsd:element>

<xsd:element name="query">
    <xsd:complexType>
      <xsd:attribute name="name" type="xsd:string"/>
      <xsd:attribute name="entry" type="xsd:string"/>
    </xsd:complexType>
  </xsd:element>

<xsd:element name="layout">
    <xsd:complexType>
      <xsd:attribute name="entry" type="xsd:string"/>
    </xsd:complexType>
  </xsd:element>

</xsd-schema>
```

FIG. 10

```xml
<?xml version="1.0" encoding="UTF-8"?>
<contents>
    <script name="script1" entry="entry-1"/>
    <script name="script2" entry="entry-2"/>
    <query name="q1" entry="entry-3"/>
    <query name="q2" entry="entry-4"/>
    .....
    <layout entry="entry-n"/>
</contents>
```

FIG. 13

```
<?xml version="1.0" encoding="UTF-8"?>
<data>
    <q1_1>
        <!?- execution result of query q1 -->
    </q1_1>
    <q1_2>
        <!?- execution result of query q1 -->
    </q1_2>
    <!?- execution result of query q2 -->
</data>
```

APPARATUS AND METHOD OF GENERATING DOCUMENT

BACKGROUND OF THE INVENTION

1. Field of the Invention

The present invention relates to an apparatus, a method, and a computer program, which create a document using acquired data.

2. Description of the Related Art

Various word processor applications have a so-called merge print function in which table data acquired from, for example, a database is inserted into a main document, where a location into which the table data is to be merged is specified, to create and print a new document.

The table data to be merged is specified using a file of a spreadsheet, a table in a database, or a query for data acquisition.

The location in the main document, into which the table data is to be merged, is specified as a merge print field. Data in the merge print field can be used to identify columns in the table data to be merged.

When merge printing is started in, for example, a personal computer (PC), print data to be transmitted to a printer is generated from the document data. Specifically, in the merge printing, the PC reads the document data to detect the merge print field. The PC identifies columns in the table data from column identification information set in the merge print field to acquire data concerning the columns. The PC replaces the data in the merge print field with the acquired data to generate print data (for example, refer to Japanese Patent Laid-Open No. 5-274311).

There is another method of merging data into a template by using a general-purpose template engine Velocity, which is provided by Apache Software Foundation as an open source, to create a document. The Velocity has Velocity Template Language (VTL). Describing the template in the VTL allows data defined outside the template to be merged into the template to create a document. For example, refer to "Velocity User Guide" (http://jakarta.apache.org/velocity/docs/user-guide.html).

In addition, Extensible Stylesheet Language Transformations (XSLT) and XSL Formatting Objects (XSL-FO) technologies of converting acquired Extensible Markup Language (XML) data into a document using a specified stylesheet are also standardized (for example, refer to "Extensible Stylesheet Language (XSL)" Version 1.0, W3C Recommendation, 2001, Oct. 15 <http://www.w3.org/TR/2001/REC-xsl-20011015/> and "XSL Transformations (XSLT)" Version 1.0 W3C Recommendation, 1999, Nov. 16<http://www.w3.org/TR/1999/REC-xslt-19991116>).

In order to embed acquired data into templates or main documents (hereinafter collectively referred to as templates) to create documents, some document generating apparatuses specify combinations of acquired data and templates to create documents.

In such an apparatus, data is acquired only when a merge instruction is issued.

FIG. 1 is a diagram to illustrate a problem associated with a conventional document generating apparatus. It is presumed that an apparatus of creating a document indicating a production output per hour is used in, for example, a factory. The apparatus acquires an accumulated output every hour and calculates a production output by subtracting the accumulated output at a time one hour before the acquisition from the acquired accumulated output to create a table of the calculated production outputs.

Acquisition of pieces of data that are dynamically varied at different points of time and embedding of the acquired pieces of data into a single document may not be realized by using existing functions of the conventional document generating apparatus described above. The above-described conventional document generating apparatus is only capable of generating a document into which one piece of data is embedded when the embedding instruction is issued.

A document may require pieces of data to be acquired at various points of time in one day. However, if a time when the data is required cannot be identified, it may be necessary to accumulate pieces of data at points of time when the data is possibly not used. For example, in order to acquire the data every one minute, it is necessary to accumulate pieces of data at 1,440 (=24×60) points of time per day. If the data is acquired every hour, no data can be generated at points of time between the hours when the data is acquired. In such a case, for example, inference of data from the adjacent pieces of data can result in low-precision data.

As described above, technologies of easily creating documents into which dynamically-varied pieces of data can be embedded may not available.

SUMMARY OF THE INVENTION

An embodiment of the present invention is provided to facilitate generating a document into which pieces of data that are dynamically varied are embedded.

According to an embodiment of the present invention, an apparatus for generating a document using acquired data is provided. The apparatus includes an input unit configured to receive an instruction indicating a time when a query for the data acquisition is to be executed; an executing unit configured to execute the query at the time indicated in the instruction received by the input unit; and a generating unit configured to generate a document using data acquired from the execution of the query by the executing unit.

According to another embodiment of the present invention, a method of generating a document using acquired data is provided. The method includes receiving an instruction indicating a time when data is to be acquired; acquiring data at the time indicated in the received instruction; and generating a document using the acquired data.

According to another embodiment of the present invention, a computer program stored on a computer-readable medium is provided that comprises instructions which, when executed by an apparatus, causes the apparatus to perform operations including: receiving an instruction indicating a time when data is to be acquired; acquiring data at the time indicated in the received instruction; and generating a document using the acquired data.

Further features of the present invention will become apparent from the following description of exemplary embodiments with reference to the attached drawings.

BRIEF DESCRIPTION OF THE DRAWINGS

FIG. 4 shows an example of an XML Schema in which the syntax of a script described in XML in a data acquisition definition is defined.

FIG. 5 shows an example of a script (script 1).

FIG. 6 shows another example of a script (script 2).

FIG. 7 shows another example of a script (script 3).

FIG. 9 shows an XML Schema indicating an example of an XML syntax for describing configuration information stored in a configuration information entry.

FIG. 10 shows an example of the configuration information that matches with the XML Schema shown in FIG. 9 and that is stored in the configuration information entry.

FIG. 13 shows an example of XML data.

DESCRIPTION OF THE EMBODIMENTS

Embodiment of the present invention will now be described with reference to the attached drawing.

Figure 1:
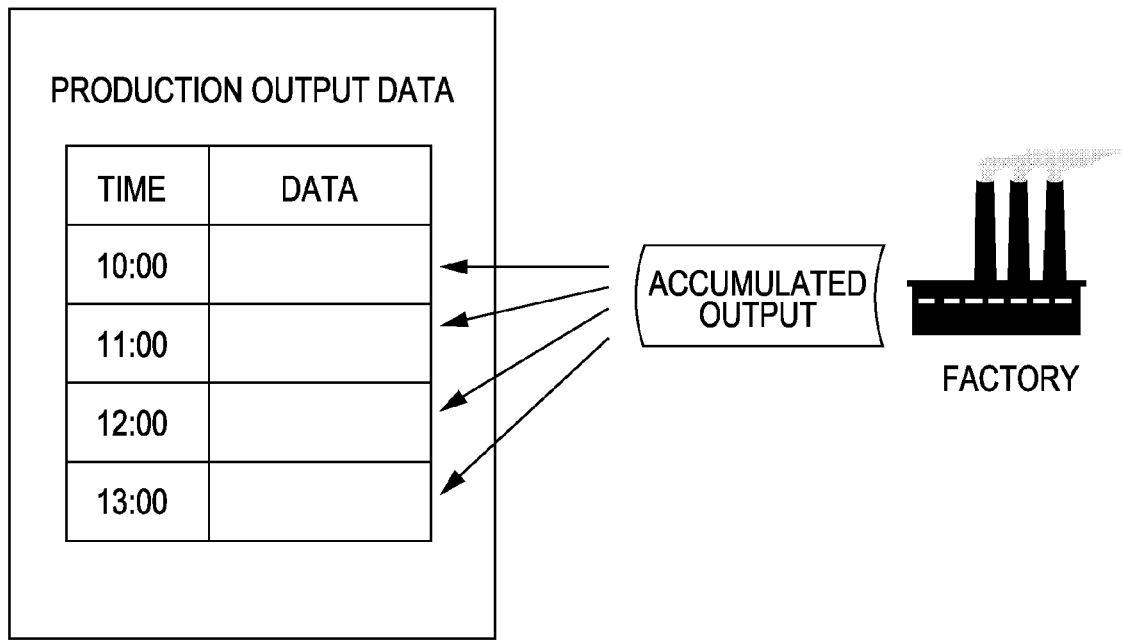
FIG. 1 is a diagram to illustrate a problem associated with a conventional document generating apparatus.
Figure 2:
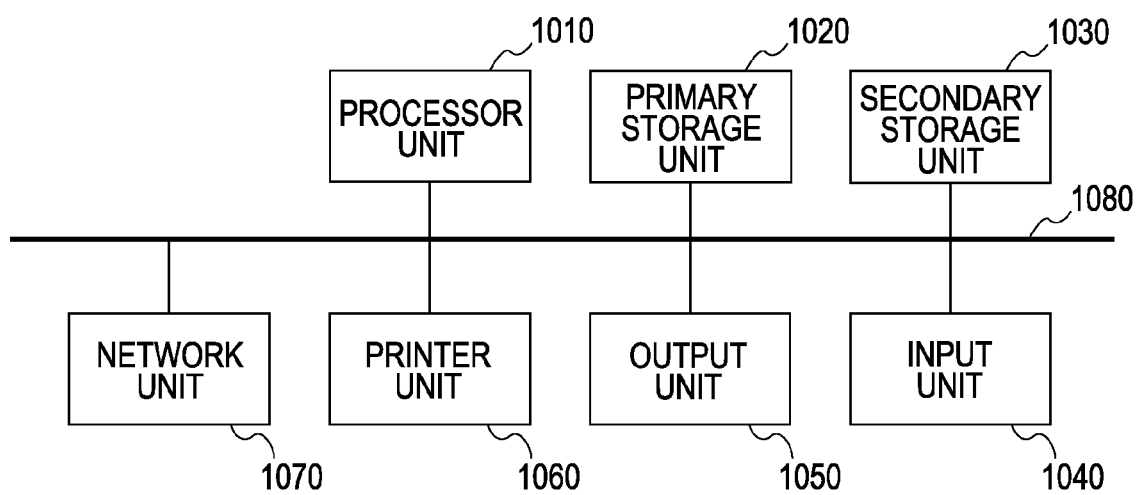
FIG. 2 is a block diagram showing an example of the hardware configuration of a document generating apparatus according to an embodiment of the present invention.

FIG. 2 is a block diagram showing an example of the hardware configuration of a document generating apparatus according to an embodiment of the present invention. Referring to FIG. 2, the document generating apparatus includes a processor unit 1010, a primary storage unit 1020, a secondary storage unit 1030, and an input unit 1040. The processor unit 1010 executes programs. Programs and data are temporarily stored in the primary storage unit 1020. Programs and data are permanently stored in the secondary storage unit 1030. The input unit 1040 includes a keyboard, a mouse, a touch panel, and so on. An operator of the document generating apparatus uses the input unit 1040 to instruct a process.

The document generating apparatus also includes an output unit 1050, a printer unit 1060, a network unit 1070, and a bus 1080. The output unit 1050 is, for example, a display. The printer unit 1060 is used to print data on a sheet of paper. The network unit 1070 is used to communicate with another apparatus over a network. The components in the document generating apparatus are connected to each other via the bus 1080.

Figure 3:
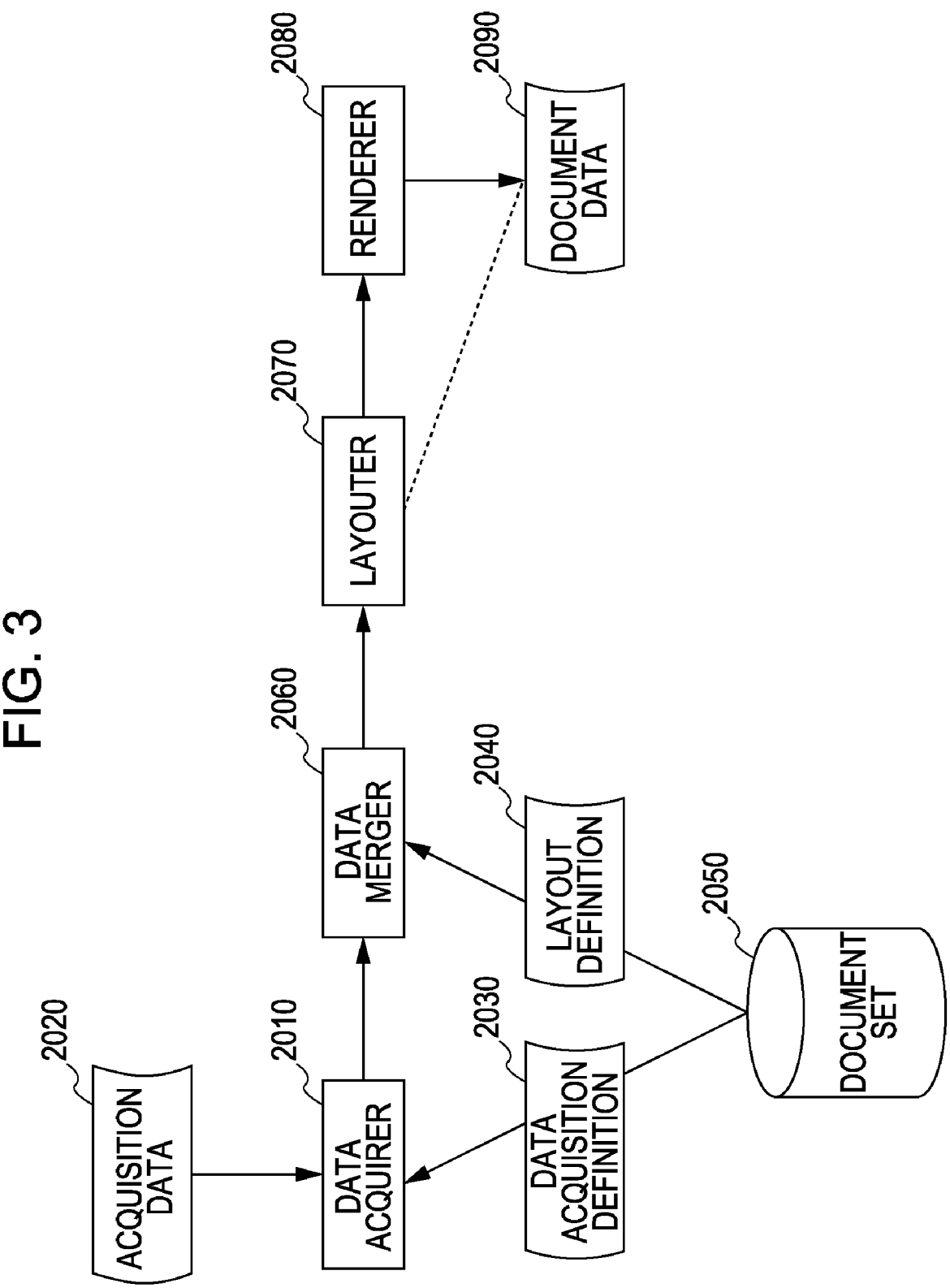
FIG. 3 is a block diagram showing an example of software executed in a processor unit in the document generating apparatus according to an embodiment of the present invention.

FIG. 3 is a block diagram showing an example of software executed in the processor unit 1010 in the document generating apparatus according to an embodiment of the present invention. The software shown in FIG. 3 is stored in the secondary storage unit 1030 as programs. After the document generating apparatus is activated, the programs are loaded from the secondary storage unit 1030 into the primary storage unit 1020 and are executed in the processor unit 1010. In an embodiment, the processor unit 1010 is a computer or a processing module that reads out the programs from the secondary storage unit 1030 and executes the readout programs.

Referring to FIG. 3, the software executed in the processor unit 1010 in the document generating apparatus includes a data acquirer 2010 that accesses a database or an application service provider (ASP) to acquire acquisition data 2020. The acquisition data 2020 is stored in the primary storage unit 1020 or the secondary storage unit 1030. In an embodiment, the data acquirer 2010 acquires the data from an external database through the network unit 1070 and stores the acquired data in the primary storage unit 1020 or the secondary storage unit 1030. Reference numeral 2030 denotes a data acquisition definition describing an acquisition method by which the data acquirer 2010 acquires the data from the database or the ASP.

Reference numeral 2040 denotes a layout definition of a document into which the acquisition data 2020 is converted. Reference numeral 2050 denotes a document set. The document set 2050 is a file including the data acquisition definition 2030 and the layout definition 2040 which are managed as a pair. The document set 2050 is stored in the secondary storage unit 1030 or the primary storage unit 1020. The software executed in the processor unit 1010 in the document generating apparatus also includes a data merger 2060 that generates layout data from the acquisition data 2020 acquired by the data acquirer 2010 and the layout definition 2040.

The software executed in the processor unit 1010 in the document generating apparatus further includes a layouter 2070 and a renderer 2080. The layouter 2070 arranges the data generated by the data merger 2060 as an actual document. The renderer 2080 converts the data arranged by the layouter 2070 into print data having a data format for printing. Reference numeral 2090 denotes document data indicating the print data generated by the renderer 2080 or the document generated by the layouter 2070.

FIG. 4 shows an example of an XML Schema in which the syntax of a script described in XML in the data acquisition definition 2030 is defined.

The document generating apparatus according to an embodiment of the present invention can describe, for example, a script shown in FIG. 5 in accordance with the XML Schema shown in FIG. 4.

The script in FIG. 5 indicates that a query having an identifier q1 is executed at 1:00 am to store the execution result with a prefix q1_1 and that the query having the identifier q1 is executed again at 2:00 am to store the execution result with a prefix q1_2. The script in FIG. 5 also indicates that a query having an identifier q2 is executed at 3:00 am. The script shown in FIG. 5 is called a script 1.

The document generating apparatus according to an embodiment of the present invention can also describe, for example, a script shown in FIG. 6 in accordance with the XML Schema shown in FIG. 4.

The script in FIG. 6 indicates that a query having an identifier q1 is executed and a query having an identifier q2 is executed three hours later. The script shown in FIG. 6 is called a script 2.

The document generating apparatus according to an embodiment of the present invention can further describe, for example, a script shown in FIG. 7 in accordance with the XML Schema shown in FIG. 4.

The script in FIG. 7 indicates that a query having an identifier q1, a query having an identifier q2, and a query having an identifier q3 are concurrently executed. The script shown in FIG. 7 is called a script 3.

As described above, a query shows a procedure for acquiring data, and a script defines the execution order of a query.

Figure 8:
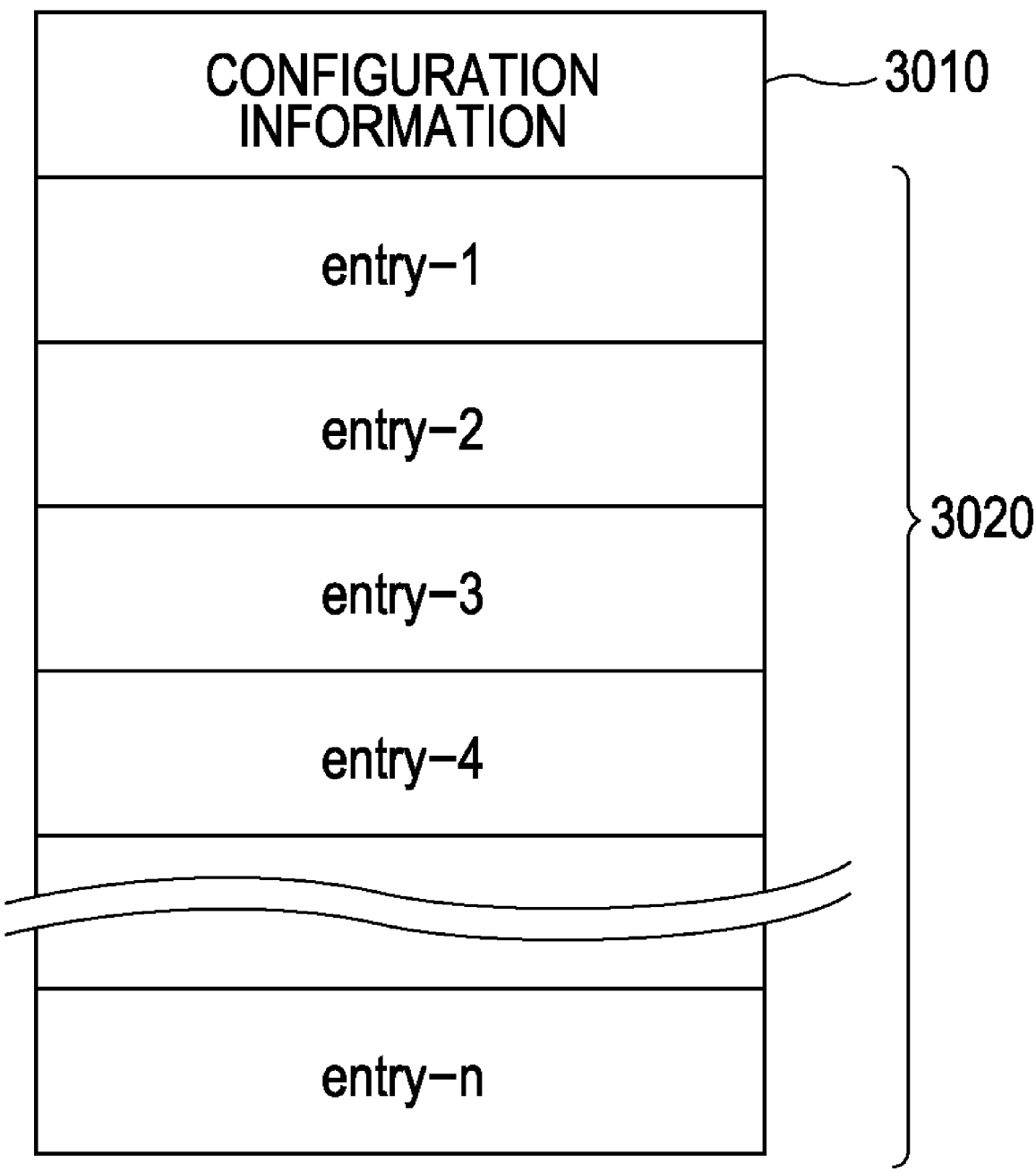
FIG. 8 shows an example of the file structure of a document set.

FIG. 8 shows an example of the file structure of the document set 2050. According to an embodiment of the present invention, the document set 2050 is an archive file in ZIP format. Referring to FIG. 8, reference numeral 3010 denotes configuration information entry indicating configuration information in the file and reference numeral 3020 denotes general entries other than the configuration information entry.

FIG. 9 shows an XML Schema indicating an example of an XML syntax for describing the configuration information stored in the configuration information entry 3010.

FIG. 10 shows an example of the configuration information that matches with the XML Schema shown in FIG. 9 and that is stored in the configuration information entry 3010. Entries including zero or more scripts, zero or more queries, and one layout definition 2040 are described in the configuration information along with name definitions thereof. The data acquisition definition 2030 includes scripts and queries.

Figure 11:
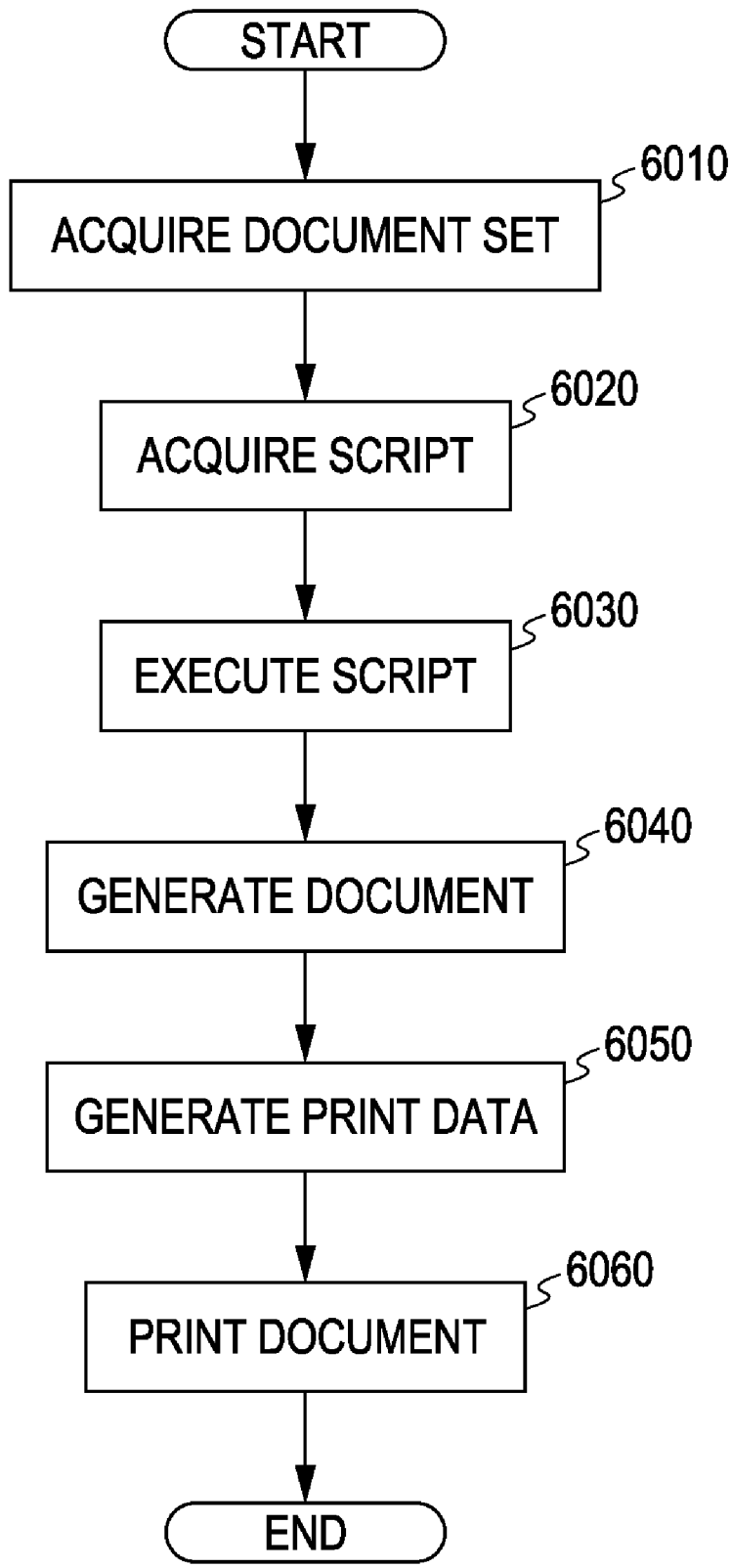
FIG. 11 is a flowchart showing an example of a process performed when a print instruction is given to the document set.

FIG. 11 is a flowchart showing an example of a process performed when a print instruction is given to the document set 2050. The print instruction includes specification of a file name of the document set 2050 to be printed and the names of scripts stored in the document set 2050. As described above, a script defines the execution order of a query.

Referring to FIG. 11, in Step S6010, the data acquirer 2010 acquires the document set 2050 from the secondary storage unit 1030 as a ZIP file on the basis of the specified file name. The data acquirer 2010 acquires the configuration information from the configuration information entry 3010 in the acquired ZIP file.

In Step S6020, the data acquirer 2010 yields the name of an entry where the script having the specified name is stored from the configuration information. Specifically, the data acquirer 2010 determines the "entry" attribute of the "script" element from the configuration information by using a technology, such as XML Query or XML Path, to yield the name of the entry. The data acquirer 2010 acquires the entry having the yielded name, where the script having the specified name is stored, from the document set 2050.

If the name of the entry where the script having the specified name is stored is not registered in the configuration information or if the entry having the yielded name (where the script having the specified name should be stored) does not exist in the document set 2050, the data acquirer 2010 performs, for example, error processing. The data acquirer 2010, then, terminates the process shown in FIG. 11.

In Step S6030, the data acquirer 2010 executes the script acquired in Step S6020.

Figure 12:
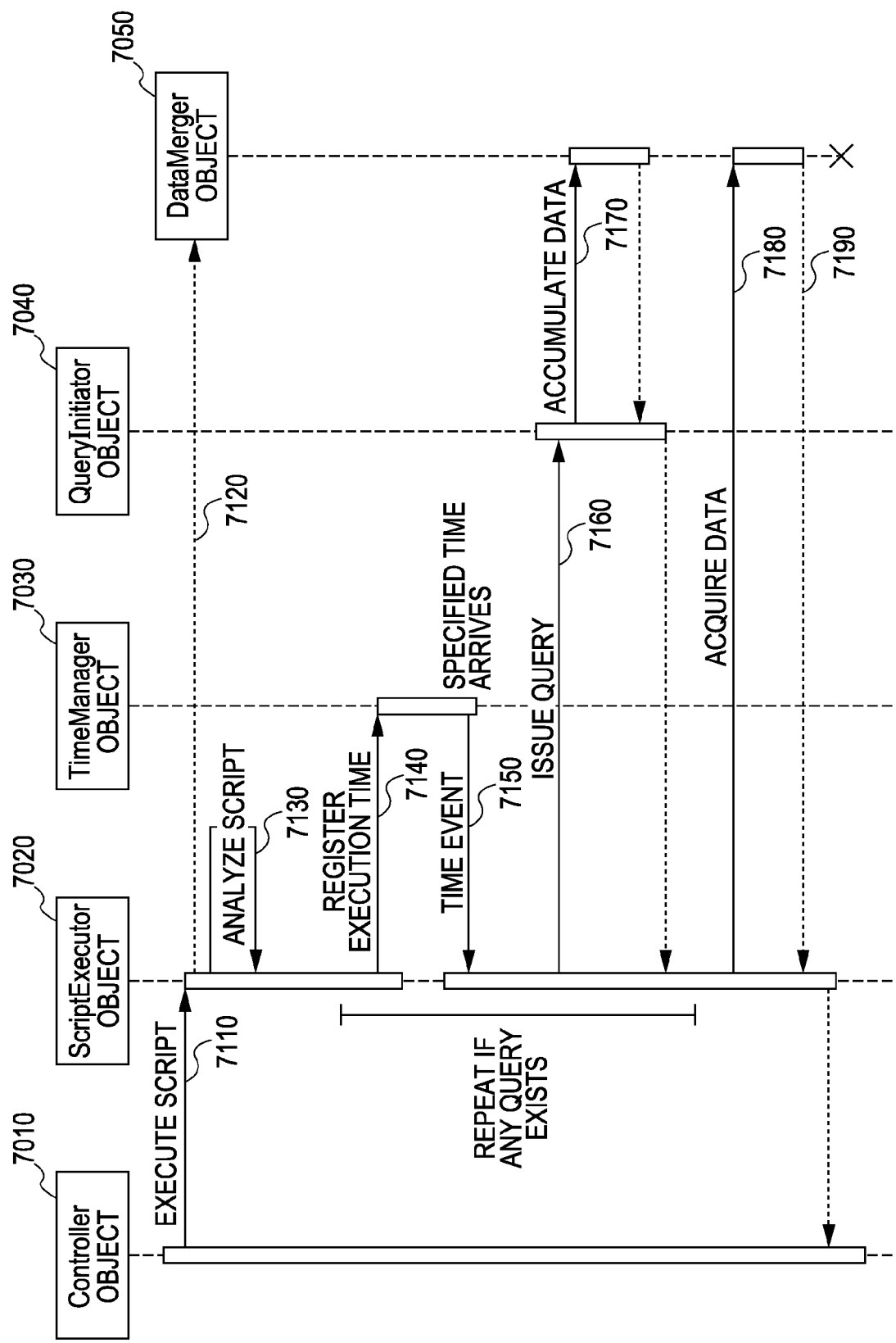
FIG. 12 is a UML sequence chart representing an example of a process of executing a script.

The execution of the script in Step S6030 will now be described in detail with reference to FIG. 12. FIG. 12 is a Unified Modeling Language (UML) sequence chart representing an example of the process of executing a script. The behavior between objects performed as programs included in the data acquirer 2010 will now be described with reference to FIG. 12.

Referring to FIG. 12, reference numeral 7010 denotes a Controller object that manages the entire data acquirer 2010 and controls the execution of the script. Reference numeral 7020 denotes a ScriptExecutor object executing the script. Reference numeral 7030 denotes a TimeManager object that manages the time when the execution of the script is started. Reference numeral 7040 denotes a QueryInitiator object that issues a query to acquire XML data from, for example, a server. Reference numeral 7050 denotes a DataMerger object that accumulates the XML data acquired by the QueryInitiator object 7040.

In Step S7110, the Controller object 7010 passes the script acquired in Step S6020 in FIG. 11 to the ScriptExecutor object 7020.

In Step S7120, the ScriptExecutor object 7020 generates the DataMerger object 7050. In Step S7130, the ScriptExecutor object 7020 analyzes the script to acquire all the "run" elements. The ScriptExecutor object 7020 manages the acquired "run" elements with identifiers assigned thereto. If an "at" attribute indicating the execution time is specified for the acquired "run" element, in Step S7140, the ScriptExecutor object 7020 registers the identifier of the "run" element and the execution time specified in the "at" attribute in the TimeManager object 7030. The script in which the "at" attribute indicating the execution time is specified for the acquired "run" element is exemplified by the script 1.

When the registered execution time arrives, then in Step S7150, the TimeManager object 7030 managing a clock issues a time event including the identifier of the registered "run" element to the ScriptExecutor object 7020. The ScriptExecutor object 7020 receives the time event and processes the "run" element recorded with the identifier specified in the time event.

The "run" elements without the "at" attributes are processed in the ScriptExecutor object 7020 in the order of the occurrences.

The "run" elements are processed in the following manner.

If a "mode" attribute has a "sequential" value indicating that a sequential process is performed, the queries are performed in the ScriptExecutor object 7020 in the order of the occurrences. As shown in the script 2 in FIG. 6, if an "interval" element exists between the "query" elements, the ScriptExecutor object 7020 executes the queries at time intervals indicated by the content of the "interval" element. The time interval at which the queries are executed means the time period after the result of the previous query is yielded before the subsequent query is issued.

The ScriptExecutor object 7020 acquires a query that is stored in the entry in the document set 2050, having an entry name corresponding to the character string indicated by the "id" attribute of the "query" element. In Step S7160, the ScriptExecutor object 7020 invokes a query issuing method in the QueryInitiator object 7040 using the acquired query, the identifier of the DataMerger object 7050, and the value of any "prefix" attribute of the "query" element as arguments.

The query issuing method in the QueryInitiator object 7040 makes an inquiry indicated in the query data to acquire XML data. If a prefix is specified as the "prefix" attribute, as in the script 1, in Step S7170, the query issuing method in the QueryInitiator object 7040 passes the acquired XML data to the DataMerger object 7050 as a child element of the element having the name of the specified prefix. If no prefix is specified, in Step S7170, the query issuing method in the QueryInitiator object 7040 directly passes the acquired XML data to the DataMerger object 7050.

The DataMerger object 7050 sequentially accumulates the passed XML data as a child element of the "data" element.

If the "mode" attribute has a "concurrent" value indicating a concurrent process, as in the script 3, the ScriptExecutor object 7020 concurrently executes all the queries.

After the all the scripts are processed, in Step S7180, the ScriptExecutor object 7020 invokes a data acquiring method in the DataMerger object 7050. In Step S7190, the XML data acquired in response to the query enclosed by the "data" elements is returned to the ScriptExecutor object 7020 as a return value of the data acquiring method.

For example, XML data shown in FIG. 13 is yielded by the execution of the script 1. FIG. 13 shows an example of XML data.

Referring back to FIG. 11, in Step S6040, the data merger 2060 yields the name of an entry where the layout definition 2040 is stored from the configuration information acquired in Step S6010. Specifically, the data merger 2060 determines the "entry" attribute of the "layout" element from the configuration information by using a technology, such as XML Query or XML Path, to yield the name of the entry. The data merger 2060 acquires the entry having the yielded name, where the layout definition 2040 is stored, from the document set 2050.

If the name of the entry where the layout definition 2040 having the specified name is stored is not registered in the configuration information, the data merger 2060 performs the error processing. If the entry having the yielded name (where the layout definition 2040 should be stored) does not exist in the document set 2050, the data merger 2060 also performs the error processing. The data merger 2060, then, terminates the process shown in FIG. 11.

According to an embodiment of the present invention, it is presumed that the layout definition 2040 is document generation specifications and is realized as a stylesheet in which conversion specifications are defined in XSLT. This stylesheet is used to convert the XML data into XSL-FO data.

Specifically, the data merger 2060 receives the XML data which the data acquirer 2010 acquires in Step S6030 and converts the XML data by using the layout definition 2040 as the stylesheet to generate the XSL-FO data.

In Step S6050, the layouter 2070 and the renderer 2080 receive the XSL-FO data generated in Step S6040 and convert the received XSL-FO data into data for printing in Page Description Language (PDL), such as PostScript.

The process of converting the XML data using the XSLT to yield the PDL data may be performed by using a tool, such as FOP developed by Apache XML project.

In Step S6060, the layouter 2070 and/or the renderer 2080 supply the PDL data generated in Step S6050 to the printer unit 1060 where the PDL data is printed.

The data yielded by executing the specified script can be printed in the above manner.

Although the XSLT is used to convert the XML data into a document that can be printed in an embodiment of the present invention, necessary data may be extracted from the acquired XML data using a template engine, such as Velocity, and the extracted data may be merged into the template to generate a document that can be printed.

The XML data is yielded by issuing the query in an embodiment of the present invention. However, if the acquired data is not in the XML format, the acquired data may be converted into the XML format for the processing.

According to an embodiment of the present invention, it is possible to acquire pieces of data at discrete points of time on the time base to represent the acquired pieces of data in the same document, thus increasing the flexibility of the document representation. In addition, it is possible to fragment a complicated data query to form simple data queries, thus simplifying the data acquisition definition. Since the fragmented simple data queries can be reused, the number of processes of creating the data acquisition definition can be reduced. Furthermore, the results of the multiple data queries can be integrated to form one piece of data. Consequently, it is possible to provide a technology of easily creating a document into which pieces of data that are dynamically varied are embedded.

According to an embodiment, to embed a plurality pieces of data into a single document, a data management function is provided that is capable of (1) acquiring a plurality pieces of data that are dynamically varied at predetermined intervals and accumulating (storing) of the acquired pieces of data along with time information, and (2) retrieving data at a specified time from the accumulated pieces of data. The use of the data management function allows the pieces of data at desired points in time to be acquired and maintained. And, a document can be generated using the pieces of data and the corresponding template.

In addition, according to an embodiment, to embed a plurality pieces of data into a single document, a program (function or apparatus) is provided that is capable of acquiring pieces of data that are dynamically varied, converting the acquired data into data in a tabular format, and inputting the converted data into a document processing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-121144 filed Apr. 25, 2006, which is hereby incorporated by reference herein in its entirety.

What is claimed is:

1. An apparatus, comprising:
   an obtaining unit configured to obtain one of first and second scripts, wherein the first script is configured to perform a first query to acquire first data at a time defined in the first script and the second script is configured to perform second and third queries to acquire second and third data, wherein an interval between the second and third queries is defined in the second script;
   an executing unit configured to execute the obtained one of the first and second scripts, wherein the first query is performed using the first script at the defined time and the first data is acquired and the second and third queries are performed using the second script in the interval and the second and third data is acquired;
   a generating unit configured to generate, in response to the obtaining unit obtaining the one of first and second scripts, a document using a layout definition corresponding to the first and second scripts and using the first data acquired by performing the first query and using the second and third data acquired by performing the second and third queries in the interval; and
   at least one processor unit coupled via a bus to a memory unit, wherein the at least one processor unit is configured to control at least one of the obtaining unit, the executing unit, and the generating unit.

2. The apparatus according to claim 1,
   wherein the executing unit executes the second script and stores the acquired second and third data with identifiers for identifying the second and third queries through which the second and third data is acquired.

3. The apparatus according to claim 1, wherein the generating unit generates a first document using a first layout definition as a style sheet and generates a second document using a second layout definition as a style sheet.

4. A method, comprising:
   obtaining one of first and second scripts, wherein the first script is configured to perform a first query to acquire first data at a time defined in the first script and the second script is configured to perform second and third queries to acquire second and third data, wherein an interval between the second and third queries is defined in the second script;
   executing, using at least one processor unit coupled via a bus to a memory unit, the obtained one of the first and second scripts, wherein the first query is performed using the first script at the defined time and the first data is acquired and the second and third queries are performed using the second script in the interval and the second and third data is acquired; and
   generating, in response to obtaining the one of first and second scripts, a document using a layout definition corresponding to the first and second scripts and using the first data acquired by performing the first query and using the second and third data acquired by performing the second and third queries in the interval.

5. The method according to claim 4, further comprising storing the acquired second and third data with identifiers for identifying the second and third queries through which the second and third data is acquired.

6. A non-transitory computer-readable medium storing a computer program that causes an apparatus to perform the method according to claim 4.

7. The non-transitory computer-readable medium according to claim 6, wherein the operations further comprise storing the acquired second and third data with identifiers for identifying the second and third queried through which the second and third data is acquired.

8. The non-transitory computer-readable medium according to claim 6, wherein generating includes generating a first document using a first layout definition as a style sheet and generating a second document using a second layout definition as a style sheet.

9. The method according to claim 4, wherein generating includes generating a first document using a first layout definition as a style sheet and generating a second document using a second layout definition as a style sheet.

* * * * *